United States Patent [19]

Yamamichi et al.

[11] 4,429,972

[45] Feb. 7, 1984

[54] SINGLE LENS REFLEX CAMERA HAVING AN ELECTRO-MAGNETIC DEVICE

[75] Inventors: Masayoshi Yamamichi; Yukio Iura, both of Kanagawa; Hiroshi Aizawa, Tokyo; Tadashi Ito, Kanagawa; Tetsuya Taguchi, Kanagawa; Tadanori Uchidoi, Kanagawa, all of Japan

[73] Assignee: Canon Kabushiki Kaisha, Tokyo, Japan

[21] Appl. No.: 231,032

[22] Filed: Feb. 4, 1981

Related U.S. Application Data

[63] Continuation of Ser. No. 973,890, Dec. 28, 1978, abandoned, which is a continuation of Ser. No. 678,207, Apr. 19, 1976, abandoned, which is a continuation of Ser. No. 545,322, Jan. 29, 1975, abandoned.

[30] Foreign Application Priority Data

Feb. 4, 1974 [JP] Japan ................... 49-14360
Jul. 27, 1974 [JP] Japan ................... 49-86370

[51] Int. Cl.$^3$ ............... G03B 7/085; G03B 7/26; G03B 17/38; G03B 19/12
[52] U.S. Cl. .................... 354/448; 354/152; 354/266; 354/271.1; 354/484
[58] Field of Search ............... 354/25 R, 25 A, 25 P, 354/25 N, 29, 30, 36, 38, 60 E, 60 R, 152, 234, 235, 195, 266–268, 271, 238, 204–206, 43, 44, 50, 51

[56] References Cited

U.S. PATENT DOCUMENTS

| | | | |
|---|---|---|---|
| 3,164,075 | 1/1965 | Schulze | 354/60 E |
| 3,220,326 | 11/1965 | Scudder | 354/60 E |
| 3,274,914 | 9/1966 | Biedermann et al. | 354/25 |
| 3,372,355 | 3/1968 | Zielasko | 335/230 |
| 3,432,782 | 3/1969 | Ellenberger | 335/229 |
| 3,475,700 | 10/1969 | Schreckenberg et al. | 335/229 |
| 3,492,431 | 2/1970 | Racki | 354/234 |
| 3,608,461 | 9/1971 | Espig | 354/238 |
| 3,683,777 | 8/1972 | Miyagawa | 354/25 |
| 3,713,371 | 1/1973 | Kurshara et al. | 354/25 |
| 3,726,199 | 4/1973 | Alfredsson et al. | 354/234 |
| 3,763,450 | 10/1973 | Flohr | 335/174 |
| 3,777,037 | 12/1973 | Kuramoto et al. | 354/44 X |
| 3,812,504 | 5/1974 | Wagonsonner et al. | 334/60 L |
| 3,824,867 | 8/1974 | Ono | 354/29 |
| 3,834,305 | 9/1974 | Gomi | 335/229 |
| 3,988,748 | 10/1976 | Iura et al. | 354/29 |
| 4,020,433 | 4/1977 | Uchidoi et al. | 354/234 X |

*Primary Examiner*—William B. Perkey
*Attorney, Agent, or Firm*—Toren, McGeady and Stanger

[57] ABSTRACT

A droppage in a power source voltage below a prescribed value is prevented by using an electro-magnetic device of low power consumption type in a single lens reflex camera, and at the same time when the power source voltage is lower than the prescribed value, an erroneous function prevent circuit is activated to make the control circuit of a camera electronically inoperative and an indication of warning is made.

6 Claims, 16 Drawing Figures

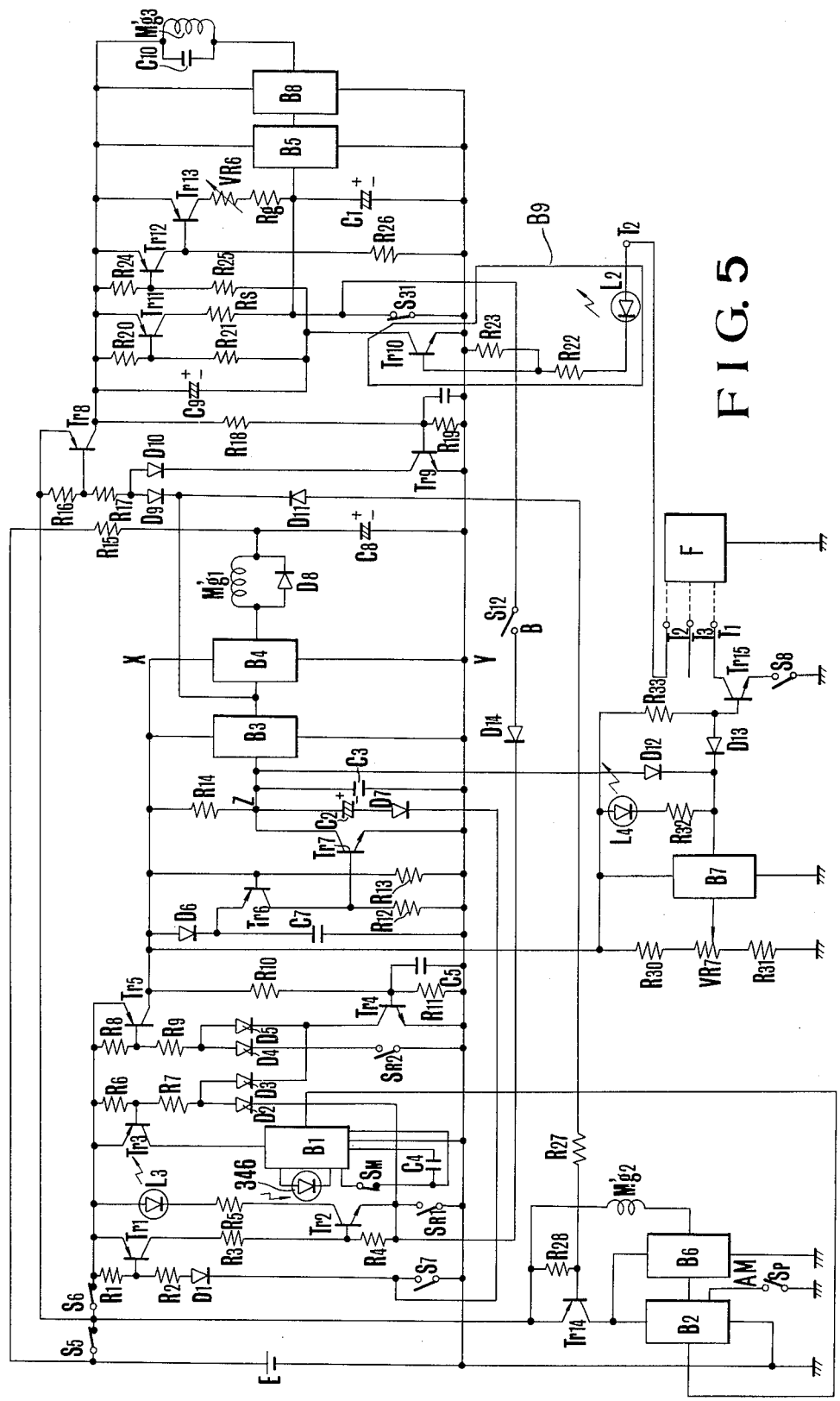
F I G. 5

SINGLE LENS REFLEX CAMERA HAVING AN ELECTRO-MAGNETIC DEVICE

This is a continuation of application Ser. No. 973,890, filed Dec. 28, 1978, which is a continuation of application Ser. No. 678,207, filed Apr. 19, 1976, which in turn is a continuation of Ser. No. 545,322, filed Jan. 29, 1975, all now abandoned.

BACKGROUND OF THE INVENTION

1. Field of the Invention:

The present invention relates to an improvement of a single lens reflex camera having an electro-magnetic device.

2. Description of the Prior Art:

It has been widely known to have an electro-magnetic device linked with various functions of a camera for starting up and controlling each function, and, generally speaking, a power source mounted to a camera is limited to one with small output (low voltage and low current) because of space limitation derived from handling characteristics and portable characteristics of a camera. Therefore, the output of said electro-magnet is necessarily limited. However, a conventional type of electro-magnetic device which has been hereto utilized is of such type as shown in FIG. 1. That is, such device is so composed that a movable iron piece 1 is attracted by the magnetic flux $\phi_1$ generated by a permanent magnet 4, then the magnetic flux $\phi_2$ is generated by flowing current to exciting coils 5, 6 for releasing said movable iron piece 1 by said magnetic flux $\phi_2$. However, in the case of such device, since the magnetic flux $\phi_2$ generated by the coils 5,6 forms a closed magnetic circuit through the permanent magnet 4 which has very large magnetic reluctance, it can not be so strong. Thus, the current flow to the coils 5, 6 for releasing the magnetic pole planes 1a, 1a' of the movable iron piece 1 from the magnetic pole planes 2a, 2a' of the yokes 2, 2' had to be large in the case of such conventional device.

Therefore, since such conventional electro-magnetic device consumes a large amount of power, the power source voltage is apt to be lowered below the prescribed value. Thus in a camera in which release is performed electro-magnetically, as said electro-magnet becomes active or inactive depending on the degree of droppage in voltage, the electro-magnet can not be completely controlled. Also in a camera in which aperture stop down and shutter control are done by an electro-magnet, control of aperture stop down and of shutter mechanism can not be sufficiently done since its prescribed voltage is lowered and thus appropriate exposure can not be obtained.

An object of the present invention is to eliminate the above mentioned shortcomings and is to provide a single lens reflex camera in which the amount of current required for pulling apart a movable iron piece of an electro-magnetic device, which activates a starting up means of said camera, can be made small for reducing the amount of power consumption.

Another object of the present invention is to conduct the driving control of various functions of a single lens reflex camera by a plural number of electro-magnetic devices, wherein by impressing pulse voltage consecutively on each electro-magnetic device, the sequence control of a camera can be easily made.

Further, another object of the present invention is to make a camera control circuit electronically inactive by the output of an erroneous function prevention circuit which functions when a power source voltage is lowered than a prescribed value and at the same time an indication of warning for said non-active state of the camera control circuit is made.

BRIEF DESCRIPTION OF THE DRAWINGS

FIG. 2b is a side elevation of the electro-magnetic device shown in FIG. 2a.

FIG. 2c is an oblique view showing a part of the electro-magnetic device shown in FIG. 2a.

FIG. 5 is an exposure control circuit diagram of the camera shown in FIG. 4.

FIG. 6b is an electric block circuit diagram of the device shown in FIG. 6a.

DESCRIPTION OF THE PREFERRED EMBODIMENTS

Figure 1:
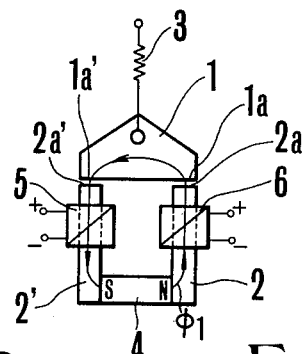
FIG. 1 is a drawing to show a conventional electro-magnetic device.
Figure 2A:
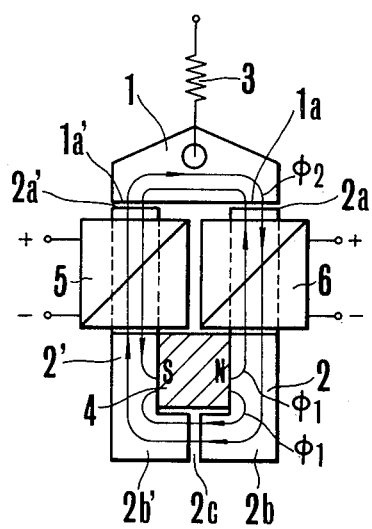
FIG. 2a is a front elevation showing a first example of an electro-magnetic device used in the present invention.
Figure 2B:
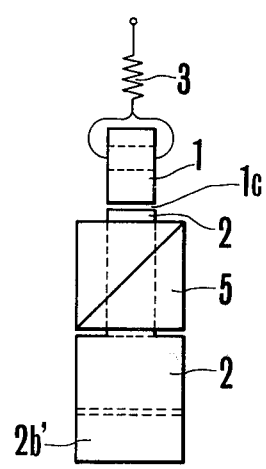
Figure 2C:
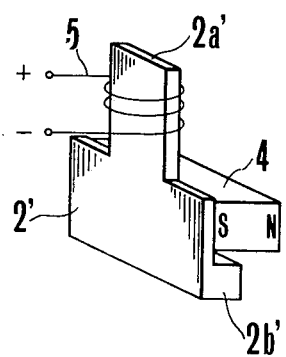

FIGS. 2a, b, c, show an example of the electro-magnetic device used in the present invention, wherein first the structure thereof will be explained. For such elements which are the same as those in the conventional device shown in FIG. 1, the same identification marks and numbers will be used and explanations therefor will be omitted. In these drawings, 1 is a movable iron piece having side planes 1a, 1a' which contact the magnetic pole planes 2a, 2a' of yokes 2 and 2', respectively, being formed by pieces of such magnetic bodies as Permalloy, electromagnetic mild iron, etc. having smaller magnetic reluctance than that of the permanent magnet 4. 3 is a spring biased to keep away the side planes 1a, 1a' of the above mentioned movable iron piece 1 from the magnetic pole planes 2a, 2a'. 4 is a permanent magnet being magnetized to form the N pole and the S pole thereon as shown in the drawing and being sandwiched by the above mentioned yokes 2, 2'. Projection parts 2b, 2b' facing to the lower part of the above mentioned permanent magnet 4 as shown in FIG. 2a are provided at the yoke 2 and yoke 2'. A closed magnetic circuit for the magnetic flux made by the current flowing to the coils 5, 6 is formed by said projection parts 2b, 2b', the yokes 2, 2' and the movable iron piece 1. Further, the end planes of the projection parts 2b, 2b' are separated from each other to adjust the magnetic reluctance of the above mentioned closed magnetic circuit. Said magnetic reluctance of the closed magnetic circuit may be adjusted by such composition that, for example, pieces of magnetic body (not shown in the drawing) having a prescribed permeability are inserted at an air gap 2c formed by said projection parts 2b, 2b'. 5, 6 are coils wound around the yokes 2, 2', respectively, and the terminal of each of the coils is connected to the (+)

terminal and the (−) terminal of a power source (not shown in the drawing).

Figure 3A:
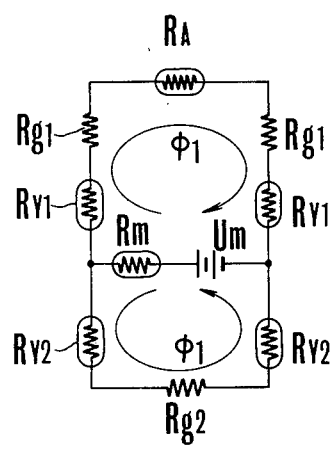
FIG. 3a and FIG. 3b are equivalent circuit diagrams of the device shown in FIG. 2.
Figure 3B:
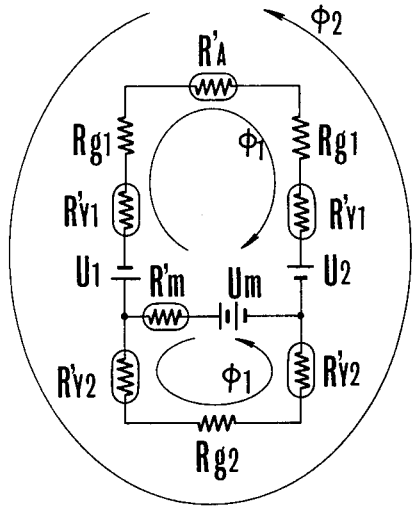

Now, explanation will be made on the function of the device with the above mentioned composition with reference to FIG. 3a, FIG. 3b. FIG. 3a is an equivalent circuit diagram of an electromagnetic device in such state that current is not flowing to the coils 5, 6 and the movable iron piece 1 is attracted onto the yokes 2, 2' by the magnetic flux $\phi_1$ from the permanent magnet 4 resisting the force of the spring 3, and FIG. 3b is an equivalent circuit diagram of an electromagnetic device in such state that current flows to the coils 5, 6 to generate the magnetic flux $\phi_2$ having opposite direction to that of the magnetic flux $\phi_1$ by the permanent magnet 4. In FIG. 3a, $R_A$ is a magnetic reluctance of the movable iron piece 1, and $R_{g1}$ is a magnetic reluctance of the air gap between the movable iron piece 1 and the yokes 2, 2', while $R_{Y1}$ is a magnetic reluctance of the yokes 2, 2', and $R_{Y2}$ is a magnetic reluctance of the projection parts 2b, 2b'. $R_{g2}$ is a magnetic reluctance of the air gap 2c, and Um shows the magneto-motive force of the permanent magnet 4, while Rm shows a magnetic reluctance of the permanent magnet. Further, in FIG. 3b, $R_A'$ is a magnetic reluctance of the movable iron piece 1, and Rm' is a magnetic reluctance of the permanent magnet 4, while $R_{Y1}'$ is a magnetic reluctance of the yokes 2, 2', further, $R_{Y2}'$ is a magnetic reluctance of the projection parts 2b, 2b' and $U_1$ shows a magneto-motive force generated by the current flowing to the coil 5, while $U_2$ shows a magneto-motive force generated by the current flowing to the coil 6. Also magnetic reluctance having the same value as that in the magnetic reluctance shown in FIG. 3a will be identified by the same marks and figures as in FIG. 3a, and explanations therefor are omitted.

Now, when current is not supplied to the coils 5, 6, the magnetic flux $\phi_1$ from the permanent magnet 4 passes through the yoke 2, the movable iron piece 1 and the yoke 2', therefore, the movable iron piece 1 is attracted onto the yokes 2, 2' against the force of the spring 3. The equivalent circuit at that time will be as shown in FIG. 3a. Next, when current flows to the coils 5, 6 to generate magnetic flux $\phi_2$ having opposite direction to the direction of the magnetic flux from the permanent magnet 4 passing through a movable iron piece 1, magnetic flux $\phi_2$ passes through a closed magnetic circuit which consists of the yoke 2' consisting of a magnetic body, the movable iron piece 1, the yoke 2 consisting of a magnetic body, a projection part 2b of the yoke 2, the gap 2c within which air as non-magnetic body exists, and the projection part 2b' of the yoke 2'. Therefore the magnetic flux $\phi_1$ is weakened by the magnetic flux $\phi_2$, and the magnetic iron piece 1 moves upward by the spring 3.

To give further detailed explanation on this point, the attracting power $F_2$ (refer to FIG. 3b) between the movable iron piece 1 and the yokes 2, 2' is expressed by the following equation:

$$F_2 = \frac{(\phi_1 - \phi_2)^2}{2\mu_o \cdot S} \times 2 - F \quad (1)$$

(In the above equation, F expresses the tensile power by the spring 3, $\mu_o$ expresses permeability, $\phi_1$ expresses magnetic flux by the permanent magnet, $\phi_2$ represents magnetic flux by the coils 5, 6 and S indicates the area of contact between the movable iron piece 1 and the yokes 2, 2').

Therefore, when the attracting force $F_2$ becomes as $F_2 < 0$, that is, as the magnetic flux reaches a certain prescribed value, the movable iron piece 1 is released.

As has been explained above, the magnetic flux $\phi_2$ passes through the magnetic path formed by the member 2b, 2b', 2c having smaller magnetic reluctance than the magnetic reluctance of the permanent magnet 4, thus the movable iron piece 1 may be kept away from the yokes 2, 2' with smaller magneto-motive force. In other words, a closed magnetic circuit with small magnetic reluctance for the magnetic flux of the coils 5, 6 is formed by the movable iron piece 1, the yokes 2, 2' and the projection parts 2b, 2b' of the yokes 2, 2' of a type for use in the present invention, therefore, it has such effect that the current flow to the coils 5, 6 for keeping away the movable iron piece 1 can be made small.

Figure 4:
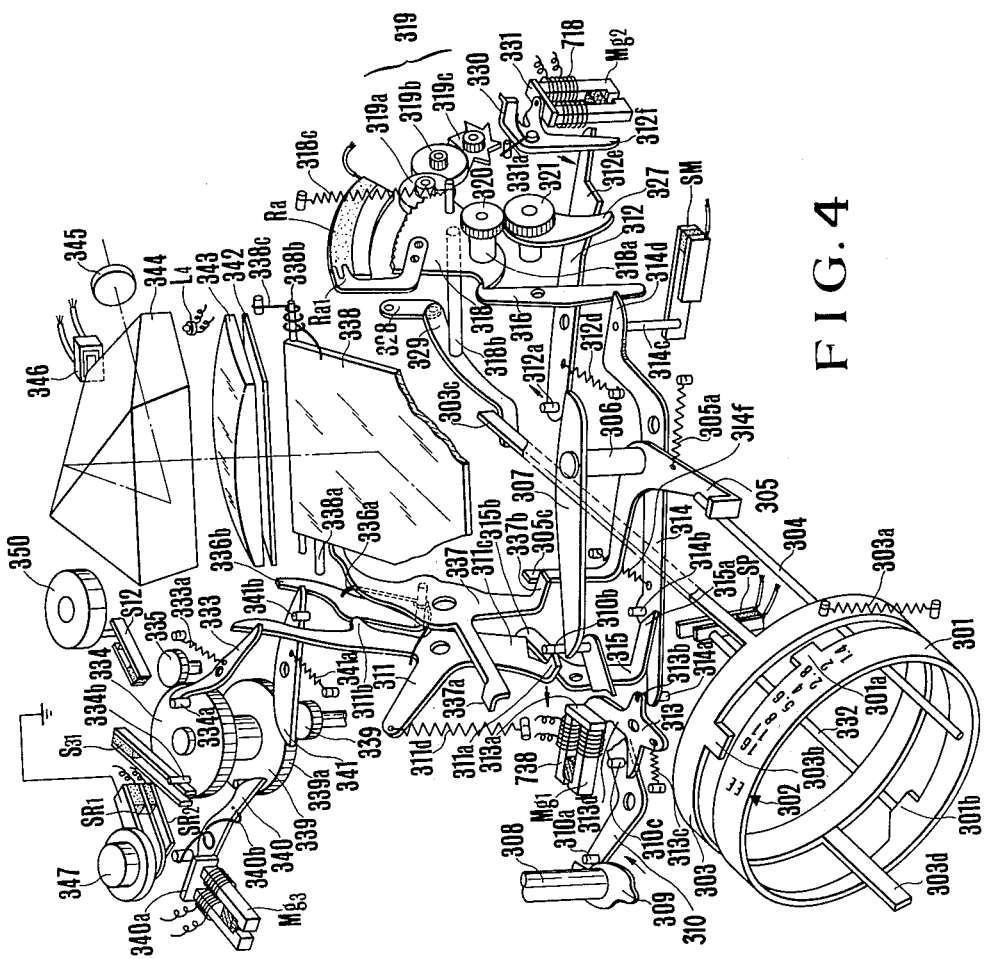
FIG. 4 is an arrangement diagram of a single lens reflex camera showing another example of the present invention.

Next, explanation will be made on an embodiment of the present invention. FIG. 4 is directed to a single lens reflex camera in which the above mentioned electromagnetic device is used as a camera starter and the erroneous functioning of the camera is prevented when the power source voltage is less than the prescribed value, particularly showing a drawing arrangement of important parts in the internal mechanism of a camera. Said drawing shows a state wherein a film wind-up and shutter charge are completed. 301 is a diaphragm ring on which an automatic diagram EE mark and manual diaphragm aperture marks are punched and at the same time a projection part 301a and a cam part 301b are provided. 302 is a mark to match up the automatic diaphragm EE mark and the manual diaphragm aperture marks. 303 is a diaphragm preset ring and is rotatably biased to clockwise direction by a spring 303a and has a projection part 303b which can engage with the above mentioned projection part 301a of the diaphragm ring 301. Also an arm 303c is provided at the diaphragm preset ring 303, and the diaphragm preset ring 303 is to determine the rotation of a bell crank through a diaphragm aperture setting cam ring by a lever 303d planted thereon, and said bell crank is to restrict the rotation of a diaphragm driving ring not shown in the drawing to determine the degree of opening of the diaphragm. 304 is a pin planted on the above mentioned diaphragm driving ring, and an end part of said pin 304 engages with an automatic diaphragm lever 305 rotatably biased in counterclockwise direction by a spring 305a. This automatic diaphragm lever 305 has a riser part 305c and an intermediate lever 307 is axially assembled to the automatic diaphragm lever 305 with a coaxis 306. 308 is a wind up axle of a wind up lever which is not shown in the drawing, and a wind up cam 309 is fixed at end plane of said wind up axle 308. 310 is a rotatable intermediate lever, and a pin 310a provided at an end part of said intermediate lever 310 engages with the wind up cam 309. A pin 310b is provided at the other end of the intermediate lever 310 and this pin 310b engages with one end of the above mentioned intermediate lever 307 and at the same time engages with one end 311a of a mirror driving lever 311. By a pin 310c provided on the intermediate lever 310, a first clamping lever 313 is made chargeable. The other end of this intermediate lever 307 is made to be engageable with a pin 312a provided at one end of a charge lever 312 which is rotatable. This charge lever 312 is rotatably biased to counterclockwise direction by a spring 312d. Mg$_1$ is an electro-magnet with a first clamping permanent magnet with a permanent magnet being rotatably biased to clockwise direction by a spring 313c and attracts one end 313a of the first clamping lever 313, while the other end 313b engages with one end 314a of a release lever 314. Also, a pin 310c planted on the intermediate lever 310 is made to be engageable with one end cam plane 313d of the above mentioned first clamping lever 313. A pin 314b is planted at one end of said release lever 314, and one end 315a of a mirror driving engagement lever 315, which has the other end 315b engaged with one side 311c of the above mentioned mirror driving lever 311, is checked by said pin 314b. One end of a rotatable EE check lever 316 is checked by end parts 314d of the release lever 314. Also, a pin 314c is planted on the other end of the release lever 314, and a movable contacting piece of a memory retention switch $S_M$ is checked by the same. This release lever 314 is rotatably biased to counterclockwise direction by a spring 314f. 318 is an EE sector gear, which is checked by the other end of the above mentioned check lever 316. Gears 319a, 319b and a stop wheel 319c, forming a speed setting mechanism 319, are engaged with said sector gear 318. And a sliding piece $Ra_1$ of a variable resistance Ra for determining a preset diaphragm aperture value is attached to the sector gear 318. A gear 320 is assembled to an axle 318a of said sector gear 318, and an EE charge gear 321 is engaged with said gear 320. A lever 327 is fixed coaxially at said gear 321, and said lever 327 contacts with a stepped part 312e at the other part of the above mentioned charge lever 312. A pin 318 is planted at the above mentioned gear 318, and the end plane of this pin 318b is fixed to a signal lever 329 axially assembled to a support lever 328. A bent end of this signal lever 329 checks an arm 303c of the above mentioned diaphragm aperture preset ring 303. The above mentioned EE sector gear 318 is rotatably biased strongly to clockwise direction against a spring 318c which is rotatably biased to counterclockwise direction on the sector gear 318.

$Mg_2$ is a magnet with a permanent magnet for diaphragm control and can attract an iron piece 331 attached to an attracting lever 330. This attracting lever 330 is rotatably biased to counterclockwise direction by a spring 331a, and a bent one end of said lever 330 can engage with a stop wheel 319c of the above mentioned speed setting mechanism 319. One end part 312f of the charge lever 312 contacts with the other end of the attracting lever 330. A pin (332) which contacts with a movable contacting piece of a manual use switch $S_p$ is planted at a lens side, and the end plane of this pin 332 contacts with the cam part 301b of the above mentioned diaphragm ring 301. The above mentioned mirror driving lever 311 has a delay device not shown in the drawing, and said mirror driving lever 311 is rotatably biased to counterclockwise direction by a spring 311d, and at the same time one end thereof is checked by the other side of the above mentioned mirror driving engagement lever 315 while the other end of the same is checked by one end of a front screen clamping lever 333. This front screen clamping lever 333 is rotatably biased to counterclockwise direction by a spring 33a and its front engages with a pin 334a planted on a front screen gear 334. Also a pin 334b is planted on the front screen gear 334 and contactedly engages with a front screen start switch $S_{31}$. This front screen gear 334 engages with a front screen pinion 335 of a front screen drum which is not shown in the drawing. And a mirror clamping lever 336 is checked by the clamping part 311b of the above mentioned mirror driving lever 311. This clamping lever is rotatably biased to counterclockwise direction by a spring 336a spanned between the lever 336 and the mirror driving lever 311, and one end of said lever 336 engages with a push up lever 337 coaxially supported at the mirror driving lever 311. One end 337a of the push up lever 337 is rotated to clockwise direction by the mirror up action from outside not being shown in the drawing so that the mirror up action can be done singularly. The other end of said push up lever 337 checks a push up pin 338a provided at the mirror 338. This mirror 338 can rotate around a mirror axle 338b. 338c is a mirror returning spring. 339 is a rear screen gear provided separately from and coaxially with the above mentioned front screen gear 334, and said rear screen gear 339 engages with a rear screen pinion 340 for a rear screen drum which is not shown in the drawing. A pin 339a is planted on the rear screen gear 339. 340 is an attracting lever rotated by the above mentioned pin 339a, and this attracting lever 340 is attracted to the magnet $Mg_3$ with shutter control permanent magnet by its iron piece 340a. This attracting lever 340 is always rotatably retained by the magnet $Mg_3$ by a spring 340b. 341 is a rear screen signal lever rotated by the above mentioned pin 339a, and said lever 341 is always rotatably retained at the position of a check pin 341b by a spring 341a. The end part 336b of the above mentioned mirror clamping lever 336 is checked by the above mentioned rear screen signal lever 341. The light penetrating through a photographing lens, not being shown in the drawing, proceeds through the mirror 338, a focal plane 342, a condensor lens 343, a pentagonal prism 344 in said order and is visually recognized by a photographer by an eyepiece 345. 346 is a light receiving element of, for example, a silicon blue cell. 347 is a shutter button, and the switch $S_{R1}$ is made ON by the first stroke of said shutter button 347, and the switch $S_{R2}$ is made ON by the second stroke of the same. $L_4$ is an illuminating diode for indicating the activation of the erroneous function prevention circuit and is placed at a part of a finder system. 350 is a shutter time setting dial, and an always opened switch $S_{12}$ is closed by setting said dial 350 at bulb.

FIG. 5 is directed to an exposure control circuit of the camera shown in FIG. 9. In FIG. 10, $S_{R1}$, $S_{R2}$, $S_M$, $S_{31}$, $S_p$, $S_{12}$ and $L_4$ represent each one of the switches and the illuminant element shown in FIG. 9, while $M'g_1$, $M'g_2$, $M'g_3$ are magnetizing coils for the magnets $Mg_1$, $Mg_2$, $Mg_3$, respectively.

In FIG. 5, E is a power source, and an information operation circuit $B_1$, a magnetizing coil $Mg_1$ control circuit $B_3$, a mono-stable circuit $B_4$, and the erroneous function prevent circuit $B_7$ are connected in parallel with said power source E, through an always closed switch $S_6$ which is opened in an association with the shutter front screen and an always closed switch $S_5$ which is opened in an association with the shutter rear screen. Also the magnetizing coil $M'g_2$, control circuit $B_2$, the mono-stable circuit $B_6$, the magnetizing coil $M'g_3$, control circuit $B_5$, and the mono-stable circuit $B_8$ are connected in parallel with the power source E through the above mentioned switch $S_5$. The control circuit $B_2$ has the above mentioned variable resistance Ra so that as the resistance value thereof reaches a prescribed level the control circuit $B_2$ becomes ON. $R_1$ and $R_2$ show bleeder resistances, $D_1$ shows a diode for preventing reverse current, and $S_7$ shows a switch for self timer, and the base of transistor $Tr_1$ is connected at the bleeder point of the bleeder resistances $R_1$ and $R_2$. $Tr_2$ is a diode driving transistor, the base of which is connected to the bleeder point of the bleeder resistances $R_3$ and $R_4$ which are connected to the collector of the transistor $Tr_1$, wherein the resistance $R_5$ and an illuminant $L_3$ for indicating the setting of self-timer are connected within the collector circuit of said transistor $Tr_2$. The above mentioned switch $S_{R1}$ is connected within the emitter circuit of said transistor $Tr_2$. $C_4$ is a memory capacitor connected within the memory circuit of the above mentioned operation circuit $B_1$, and $S_M$ is the above mentioned memory retention switch. Since this switch $S_M$ is connected in a photo-sensing circuit having the above mentioned light receiving element 346 of the operation circuit $B_1$ and in the memory circuit, the brightness value of an object just before the above mentioned mirror 338 goes up is memorized as an electric signal in the memory capacitor $C_4$. $Tr_3$ is a transistor having a current supply control switch function for supplying current to the operation circuit $B_1$, and this transistor $Tr_3$ has its base connected to the bleeder connecting point of the bleeder resistances $R_6$ and $R_7$, and is connected to the above mentioned switch $S_{R1}$ and to the collector of the transistor $Tr_4$ through diodes $D_2$, $D_3$ for preventing reverse current being connected in parallel. Also transistor $Tr_5$ is a transistor having a current supply control switch function for supplying current to the above mentioned magnetizing coil $M'g_1$ control circuit $B_3$ and the mono-stable circuit $B_4$. This transistor $Tr_5$ has its base connected to the bleeder connecting point of the bleeder resistances $R_8$ and $R_9$, and is connected to the above mentioned switch $S_{R2}$ and the collector of the retention transistor $Tr_4$ through diodes $D_4$, $D_5$ for preventing reverse current being connected in parallel. This transistor $Tr_5$ turns ON as the switch $S_{R2}$ is actuated by a second pressing down of the above mentioned shutter button 347, and, as a result, the transistor $Tr_4$ is converted to ON state through the resistance $R_{10}$. Since the base potential of the transistor $Tr_5$ is retained at low level with the transistor $Tr_4$ being placed in ON state, even if the switch $S_{R2}$ returns to OFF state by return of the button 347, the transistor $Tr_5$ keeps its ON state. $R_{14}$ and $C_3$ are resistance and capacitor composing a delay circuit to delay the actuation of a camera during photo-sensing operation particularly in repeated photographing, and each impedance value is so set that the time constant thereof will be about $10_m$ sec. $C_2$ is a capacitor for setting half timer time being connected to the above mentioned switch $S_7$ through a diode $D_7$ for preventing reverse current. $Tr_6$ and $Tr_7$ are transistors for discharging the charged electric charge of the capacitors $C_2$, $C_3$ to return the same to reset state, and $C_7$ is a capacitor to regulate said discharging time, while $D_6$ is a diode to prevent reverse current. As the charging level of the capacitors $C_2$, $C_3$ reaches a prescribed level, the magnetizing coil $M'g_1$ control circuit $B_3$ is actuated to trigger the mono-stable circuit $B_4$, and, as a result, driving pulse of rectangular shape is impressed to the magnetizing coil $M'g_1$. $C_8$ and $R_{15}$ are a capacitor and a charging resistance for accumulating electric charge for rapidly magnetizing the magnetizing coil $M'g_1$. The output terminal of the magnetizing coil $Mg_1$ control circuit $B_3$ is connected to the base of the transistor $Tr_{14}$ through a diode $D_{11}$ and a resistance $R_{27}$ in said order. This transistor $Tr_{14}$ is a current supply control transistor connected in the current supply path for the above mentioned magnetizing coil $M'g_2$ control circuit $B_2$, and is also a transistor for controlling the magnetizing coil $M'g_2$. When the circuit $B_2$ is actuated, the mono-stable circuit $B_6$ is triggered, and driving pulse of rectangular shape is impressed to the magnetizing coil $M'g_2$. $S_p$ is a change over switch for auto and manual as mentioned above, that is an AM change over switch, and places the control circuit $B_2$ in an operative state by its change over to A side, while placing said control circuit $B_2$ in an operative state by its change over to M side. $S_{31}$ is, as mentioned above, a count start switch for shutter, and $C_1$ is a capacitor for setting shutter time, and forms a time constant circuit together with a variable resistor $VR_6$ which has its resistance value set by the shutter dial 350. $Tr_8$ and $Tr_9$ are transistors for controlling current supply to the magnetizing coil $M'g_3$ control circuit $B_5$, wherein the base of the transistor $Tr_8$ is connected to the bleeder point of the bleeder resistances $R_{16}$, $R_{17}$, and at the same time the collector of the same is connected to the collector of the transistor $Tr_9$ through a diode $D_{10}$. Since the base of the transistor $Tr_9$ is connected to the bleeder connecting point of the bleeder resistances $R_{18}$, $R_{19}$, as the transistor $Tr_8$ is placed in ON state being able to supply current, the transistor $Tr_9$ has power supplied thereto and the base level of the transistors $Tr_8$ is lowered and the transistor $Tr_8$ is retained in ON state. $L_2$ is an illuminant diode connected to an accessory shoe terminal $T_2$ of a camera and is connected to a neon tube circuit being connected to a main capacitor of a conventionally known type of flash device. It emits light when the charged potential of the main capacitor at the flash device reaches a prescribed value, to have a transistor $Tr_{10}$, with its base connected to said diode, have power supplied thereto. The block shown by dotted line in the drawing is a block to generate a control signal to automatically convert the shutter time to flash time by the charging completion signal of a flash device, wherein the collector of the transistor $Tr_{10}$ is connected to the base of a transistor $Tr_{11}$. Thus, when the transistor $Tr_{10}$ becomes ON, the transistor $Tr_{11}$ becomes ON and a resistance $R_s$ is connected in series to the capacitor $C_1$. On the other hand, since the transistors $Tr_{12}$, $Tr_{13}$ become OFF as the transistor $Tr_{10}$ becomes ON, the shutter time is set to such time as suitable for flash photographing, for example, 1/60 second, being set by a time constant circuit formed by the resistance $R_s$ and the capacitor $C_1$. A capacitor $C_9$ being connected to the transistor $Tr_{10}$ is to get charged within itself as the transistor $Tr_{10}$ becomes ON, for preventing the charging completion signal from momentarily becoming imperfect when the flash device flashes, to delay the return from the flash photographing time to daylight photographing time. And $T_1$, $T_2$, $T_3$ represents a synchronizing terminal, an automatic time change over terminal, and a diaphragm control terminal, respectively, of a flash device F. Also, the above mentioned capacitors $C_2$, $C_3$ are connected to the erroneous function prevention circuit $B_7$ through a diode $D_{12}$. A sliding piece of a variable resistance $VR_7$ of a series circuit consisting of a resistance $R_{30}$, a variable resistance $VR_7$, and a resistance $R_{31}$ is connected to said erroneous function prevention circuit $B_7$. Therefore, when the power source E has its voltage lowered than a prescribed voltage, the bleeder level of the resistance $R_{30}$, the variable resistance $VR_7$, and the resistance $R_{31}$ becomes lower than the internal voltage level of the erroneous function prevention circuit $B_7$, then said circuit $B_7$ becomes ON. As a result, the above mentioned illuminant diode $L_4$ is placed in a conductive state through the resistance $R_{32}$ and the capacitors $C_2$, $C_3$ are grounded through the diode $D_{12}$. Also, when the power source E is higher than a prescribed voltage, the bleeder level of the resistance $R_{30}$, the variable resistance $VR_7$, and the resistance $R_{31}$ becomes higher than the internal voltage level of the erroneous function prevention circuit $B_1$, and the erroneous function prevention circuit $B_7$ is placed in OFF state. Therefore, the illuminant diode $L_4$ will not have power supplied thereto and the capacitors $C_2$, $C_3$ are not grounded. The variable resistance $VR_7$ is to make fine adjustment for variation in the internal resistance of the resistances $R_{30}$, $R_{31}$ and the erroneous function prevention circuit $B_7$. $Tr_{15}$ is a transistor which becomes OFF when the erroneous function prevention circuit $B_7$ becomes ON, and is connected in series to a synchronizing contact switch $S_8$ of the flash device F.

Next, the function of the above mentioned set-up will be explained. Explanation will initially be made in the case of shutter preference. First, the shutter dial 350 is set at a desired time. Then, as the EE mark of the diaphragm ring 301 is matched with the mark 302 as shown in the drawing, the switch $S_p$ is changed over to auto side through the contacting relationship between the cam part 301b and the pin 332. As the switch $S_{R1}$ is placed in ON state by pressing of the shutter button 347, the operation circuit $B_1$ has power supplied thereto and such electric signal as corresponding to an object brightness is formed by the light receiving element P by a light penetrating through the photographing lens and charging of the memory capacitor $C_4$ is started. As the shutter button is further pressed down, the switch $S_{R2}$ becomes ON. Therefore, the transistor $Tr_5$ becomes ON and at the same time the retention transistor $Tr_4$ is placed in ON state, thus the transistor $Tr_5$ is retained in ON state, and even if a photographer's hand is left off the shutter button 347 thereafter, the operative state is continuted by the transistors $Tr_4$ and $Tr_5$. As a result, current supply to the magnetizing coil $M'g_1$ control circuit $B_3$, the mono-stable circuit $B_4$ and the erroneous function prevention circuit $B_7$ is started to place them in operative state.

At this time, if the power source E is lower than a prescribed voltage, the bleeder level of the resistance $R_{30}$, the variable resistance $VR_7$, and the resistance $R_{30}$ becomes lower than the reference voltage level within the erroneous function prevention circuit $B_7$, placing said circuit $B_7$ in ON state. As a result, the illuminant diode $L_4$ has current supplied thereto through the resistance $R_{32}$, and the illuminant diode $L_4$ is lighted to indicate the fact that the power source is lower than the prescribed voltage within a finder, and at the same time, the capacitors $C_2$, $C_3$ are grounded through the diode $D_{12}$, discharging the charge of said capacitors $C_2$, $C_3$. By this, the camera will not be started, instead, will be placed in an inoperative state, since a pulse is not impressed on the magnetizing coil $M'g_1$.

Also, if the power source E at this time has a prescribed level of or higher voltage, the bleeder level of the resistance $R_{30}$, the variable resistance $VR_7$, the resistance $R_{31}$ will be such high as to place the erroneous function prevention circuit $B_7$ in OFF state. Because of this, the illuminant diode $L_4$ will not have current supplied thereto, and the capacitors $C_2$, $C_3$ are not grounded. Therefore, the following operations will be made. Since the transistors $Tr_7$ becomes OFF by initiation of current supply to the magnetizing coil $M'g_1$ control circuit $B_3$, the mono-stable circuit $B_4$, charging to a time constant circuit consisting of the capacitor $C_3$ and the resistance $R_{14}$ is started. Since the magnetizing coil $M'g_1$ control circuit $B_3$ becomes ON as the charged potential of the capacitor $C_3$ reaches a prescribed level, the transistor $Tr_{14}$ is placed in ON state and power supply to the magnetizing coil $M'g_2$ control circuit $B_2$ is started and at the same time, the mono-stable circuit $B_4$ is triggered. As a result, driving pulse of rectangular shape is impressed to the magnetizing coil $M'g_1$, therefore the magnetic power of the permanent magnet is offset by the magnetic power of the magnet $Mg_1$, losing the attracting power, and the first clamping lever 313 is rotated to clockwise direction by the spring 313c. That is the one end 314a of the release lever 314 resists the force of the spring 314f by the pin 313b of the first clamping lever 313, and the release lever 314 rotates to counterclockwise direction. By this, the memory switch $S_M$ becomes OFF by the pin 314c and the charged voltage of the capacitor $C_4$ is memorized and retained and at the same time, the mirror driving engagement lever 315 rotates by the pin 314b, but details of this function will be explained later. Also by the rotation of the release lever 314 in a counterclockwise direction, the check lever 316 rotates in a counterclockwise direction and the engagement with the sector gear 318 is released. Also since the rotation of the sector gear 318 shifts the signal lever 329 downward through the pin 318b, the diaphragm preset ring 303 which makes the arm 303c checked by said signal lever 329 rotates the sector gear 318 to counterclockwise direction by the spring 303c against the spring 318c. Because of this, the gears 319a, 319b, 319c forming the speed setting mechanism 319 rotate and the stop wheel at the last step rotates to counterclockwise direction. Also by the rotation of the sector gear 318 the sliding piece $R_{a1}$ of the variable resistance Ra is slided. As its resistance value reaches a prescribed level the control circuit $B_2$ becomes ON to trigger the mono-stable circuit $B_6$, and pulse is given to the magnetizing coil $M'g_2$. By this, the magnetic power of the permanent magnet is offset by the magnetic power of the magnet $Mg_2$, losing the attracting power, to keep away the iron piece 331.

By this, the attracting lever 330 rotates to counterclockwise direction by the spring 331a and its bent part engages with the stop wheel 319c to stop rotation of the stop wheel 319c. Therefore, the position of the sector gear 318 is determined. Thus, when the rotation of the sector gear 318 is stopped as mentioned above, the diaphragm preset ring 303 is rotated to the position of appropriate diaphragm aperture value, thereby the position of the bell crank is determined. In other words, the stopping position of the diaphragm preset ring 303 becomes such diaphragm aperture value as determined by the information from the light receiving element 346 which senses the light passing through the photographing lens, the set shutter speed, the film sensitivity and the exposure correction information. On the other hand, in parallel with the start of such EE operation, the automatic diaphragm mechanism is started. That is, as counter magnetizing pulse enters into the $Mg_1$, the first clamping lever 313 rotates to clockwise direction by the spring 313c, and the release lever 314 rotates to counterclockwise direction, thereby the end part 315a of the mirror driving engagement lever 315 rotates to counterclockwise direction through the pin 314b of said lever 314. That is, the engagement between one side 311c of the mirror driving lever 311 and one end 315b of the mirror driving engagement lever 315 disengages and the mirror driving lever 311 rotates to counterclockwise direction by the spring $311d$. At the same time, since the claw part $311b$ of the mirror driving lever 311 and the clamping lever $313b$ are in a checked state, the push up lever 337 which axially supports the clamping lever 336 rotates to counterclockwise direction. Therefore, the automatic diaphragm lever 305 is rotated to clockwise direction by the bent part $337b$ of the push up lever 337, being engaged with the riser part $305c$ of the automatic diaphragm lever 305. By this, the pin 304 planted on the diaphragm driving ring is actuated and the diaphragm aperture is so stopped down as corresponding to the position of the bell crank, which has been preset. Also the push up pin $338a$ of the mirror 338 is pushed up by the rotation of the push up lever 337 to counterclockwise direction, thus the mirror 338 is pushed up.

Along with said push up action of the mirror 338, a delay device which is not shown in the drawing is actuated, and after an elapse of delay time by said delay device the front screen clamping lever 333 is rotated to clockwise direction by the above mentioned mirror driving lever 311. Said delay time by the delay device is for making shutter start after an elapse of such time as required for shifting from the maximum aperture to the minimum aperture. By this, the front screen gear 334 starts rotating and the front screen is made to run through the front screen pinion 335. By running of the front screen the count start switch $S_{31}$ is made to become OFF by a conventionally known method, and after an elapse of such period of time as determined by the variable resistance $VR_6$ which has such resistance value as corresponding to the set shutter speed and the capacitor $C_1$, the control circuit $B_5$ becomes ON to trigger the mono-stable circuit $B_8$, and the pulse is given to the magnetizing coil $M'g_3$. By this, the magnetic power of the permanent magnet is offset by the magnetic power of the magnet $Mg_3$, losing the attracting power. Therefore, the locking of the rear screen gear 339 by the attacting lever 340 is released, therefore, the rear screen gear 339 starts rotation to run the rear screen through the rear screen pinion 340. Also, when the running of the rear screen is completed, the rear screen signal lever 341 rotates to counterclockwise direction with the pin of the $339a$ by the rotation of the rear screen gear 339, to rotate the mirror clamping lever 336 to clockwise direction. The engagement with the mirror driving lever 311 is released by said rotation of the mirror clamping lever 336. By this, the push up lever 337 rotates to clockwise direction by the spring $305a$ through the automatic diaphragm lever 305, and the mirror 338 returns to its original position by a return spring $338c$.

At the same time, the automatic diaphragm lever 305 is rotated to counterclockwise direction by the spring $305a$ and the pin 304 planted on the diaphragm driving ring returns, resuming the original fully opened state. And as the wind up action is done by the wind up axle 308, the film wind up and the shutter charge are done, and at the same time the charge lever 312 is charged through the intermediate levers 310 and 307, and the automatic diaphragm mechanism and the mirror mechanism are charged, then the parts which have had their engagement released by the above mentioned release action will be again engaged and are returned to the state shown in the drawing.

Next, explanation will be made in the case of manual. First when the desired diaphragm aperture value of the diaphragm ring 301 is matched with the mark 302, as the pin 332 comes off the cam part $301b$, the switch $S_p$ is changed over to manual side, and the magnetizing coil $M'g_2$ control circuit $B_2$ is placed in an inoperative state. By pressing action of the shutter button 347, charging of the memory capacitor $C_4$ is started as in the case of shutter preference. And as the shutter button 347 is further pressed down, supply of power to the magnetizing coil $M'g_1$ control circuit $B_3$, the mono-stable circuit $B_4$, and the erroneous function prevention circuit $B_7$ is started in similar manner as in the case of shutter preference, placing them in an operating state. At this time, when the erroneous function prevention circuit $B_7$ detects the voltage being lower than the prescribed voltage, the camera becomes inoperative as in the case of shutter preference. As the erroneous function prevention circuit $B_7$ detects the voltage being equal to or higher than the prescribed voltage, the first clamping magnet $M_2$ with permanent magnet is counter magnetized as in the case of the shutter preference, and the first clamping lever 313 rotates to clockwise direction by the spring $313c$. That is, as the release lever 314 is rotated to counterclockwise direction by the one end $313b$ of the first clamping lever 313. The check lever 316 rotates to counterclockwise direction by the rotation of the release lever 314 to counterclockwise direction, to release the engagement with the sector gear 318. By this, the sector gear 318 rotates to clockwise direction by the spring $303a$ through the diaphragm preset ring 303, the signal lever 329 against the spring $318c$, therefore the signal lever 329 is shifted downward to prescribed position through the pin $318b$.

By this, the diaphragm preset ring 303 which has the arm $303c$ checked by the signal lever 329 rotates by the spring $303a$ to the position of the projection part $301a$ of the diaphragm ring 301. Thus, the diaphragm preset ring 303 rotates to the position of the set diaphragm aperture value, and the position of the bell crank is determined.

Also, as the release lever 314 rotates to counterclockwise direction, the automatic diaphragm mechanism also starts. That is, by the rotation of the release lever 314, the mirror rotation engagement lever 315 is rotated to clockwise direction by the pin $314b$ to conduct stop down of diaphragm aperture as in the shutter preference photographing, and at the same time, the mirror push up is done for making the shutter to start. Also after this shutter control, the return of the mirror 338 and the return of the automatic diaphragm lever 305 are done.

Also, when the self timer is used, as the switch $S_1$ is made ON and the shutter button 347 is pressed, the transistors $Tr_1$ and $Tr_2$ become On as the switch $S_1$ is put in and the self timer mode indication illuminant diode $L_3$ is lighted to notify the photographer that photographing will be done by self timer mode. When the shutter button 347 is further pressed down the switch $S_2$ is closed and the transistors $Tr_4$ and $Tr_5$ are made ON, thereby power supply to the magnetizing coil $M'g_1$ control circuit $B_3$, the mono-stable circuit $B_4$ and the erroneous function prevention circuit $B_7$ is started, to place them in operating state. At this time, when the erroneous function prevention circuit $B_7$ detects lower voltage than the prescribed voltage, the camera becomes inoperative as mentioned above. And when the erroneous function prevention circuit $B_7$ detects the voltage being equal to or higher than the prescribed voltage the prevention circuit $B_7$ does not become ON as mentioned above, and transistors $Tr_7$ becomes OFF by starting of current supply, thus charging of the time constant circuit consisting of the capacitors $C_2$, $C_3$ and the resistor $R_{14}$ is started. Since the above mentioned diode $L_3$ will be put out by placing the switch $SR_1$ in OFF state once the pressing of the shutter button 347 is released, the unnecessary power consumption is eliminated. And when the charge level of the capacitors $C_2$, $C_3$ reaches the prescribed potential, the control circuit $B_3$ becomes ON, then the action thereafter will be the same as in the above mentioned case.

When a flash device is mounted to the accessory chute of a camera, the charged voltage of the illuminant capacitor of the flash device is detected by the voltage detection circuit with a conventionally known neon tube, etc., and the output thereof is impressed to the diode $L_2$ through the terminal $T_2$. By this lighting of the diode $L_2$ the transistor $Tr_{10}$ becomes ON while the transistor $Tr_{13}$ becomes OFF, therefore, the time constant circuit of the control circuit $B_5$ input is formed by the resistance RS and the capacitor $C_1$, then the shutter time is set at the flashing time by the time constant thereof. Action thereafter will be the same as in the above case. Also in this case, since the transistor $Tr_{15}$ is connected in series to the synchronizing switch $S_8$, when the power source voltage is below the prescribed voltage the transistor $Tr_{15}$ becomes OFF as the erroneous function prevention circuit $B_7$ becomes ON, thus the flash device F does not emit light even if the synchronizing contact switch $S_8$ becomes ON.

Next, explanation will be made in the case when bulb photographing is made. The switch $S_{12}$ is a switch which is put in, in an association with setting of the shutter dial 110 at the "B" (bulb) photographing set position of said dial, and in the case of bulb photographing the variable resistance $VR_6$ is set to an appropriate resistance value. When the dial 110 is set at "B" and the shutter release button is pressed, a discharge path is formed at the capacitor $C_1$ through the switch $S_{12}$ and diode $D_{14}$ therefore charging of the capacitor $C_1$ is not made and the shutter front screen only runs, leaving the shutter fully opened. As the switch $S_{R1}$ is opened when the button 347 is returned, charging of the capacitor $C_1$ is started through the resistance $VR_6$, and after an elapse of prescribed length of time, the electro-magnet $Mg_3$ is magnetized, therefore the shutter rear screen 113 runs to conduct the shutter closing action, thus bulb photographing is done.

In this case, also, as the erroneous function prevention circuit $B_7$ becomes ON, the camera becomes inoperative as in the above mentioned case.

As has been explained above, in the present invention, when power source voltage becomes lower than the prescribed value, the erroneous function prevention circuit is actuated to make the camera control circuit electronically inoperable, therefore, whenever a camera functions appropriate exposure can always be obtained, and the fear of failure in photographing can be eliminated.

Figure 6A:
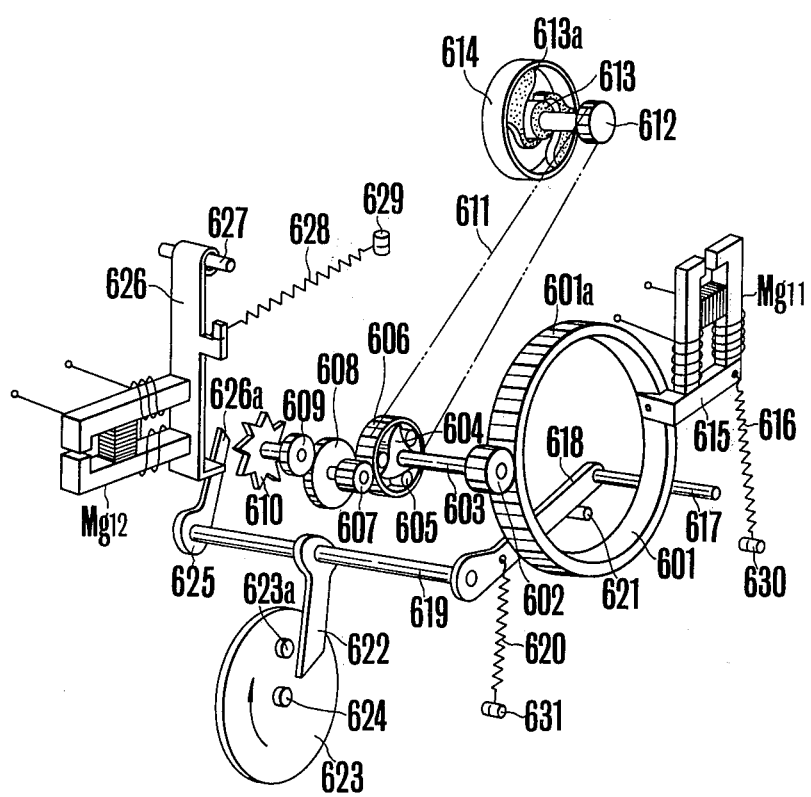
FIG. 6a is an arrangement diagram of an automatic focussing device showing another example of the present invention.
Figure 6B:
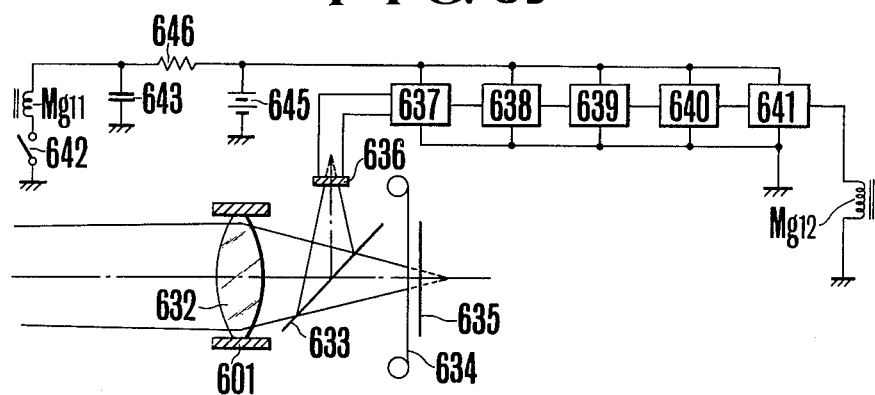

Next, an additional example of the present invention will be explained. FIG. 6a and FIG. 6b show the above mentioned electro-magnetic device being used for automatic focus adjustment of a camera. In FIG. 6a, 601 is a lens barrel to hold a photographing lens not being shown in the drawing, and being so arranged as making the forward and backward movement of the photographing lens possible through the rotation of 601 by a conventionally known means. Also a gear 601a is formed at the external circumference of 601. 602 is a pinion engaged with the above mentioned gear 601a, and a cam 604 is fixed at the other end of the supporting axle of the pinion. The roller 605 is provided between the internal circumferential plane of the gear 606 and the above mentioned cam 604 to form mono-directional clutch. 607, 608, 609 are reduction gears. A ratchet wheel 610 is fixed to the other end of the support axle of 609. On the other hand, the rotation of 606 is transmitted to the gear 612 through a rotation transmitting means outline of which is shown by 611.

A control member 613 is fixed to the other end of the support axle of 612. The external circumference of the tongue part 613a of the 613 contacts with the internal circumference of the control wheel 614 provided coaxially with 612. An attracting piece 615 manufactured by soft magnetic material is fixed at the above mentioned lens barrel 601, and is so provided as can be attracted and separated by the $Mg_{11}$. A spring 616 is attached to said attracting piece 615 to give the rotating tendency to clockwise direction to the above mentioned lens barrel 601. 617 fixed on the lever 618 is a lens barrel reset pin and is provided within the rotating zone of the above mentioned attracting piece.

The lever 618 is fixed at its support axle and is given the rotating tendency to clockwise direction by the spring 620, and at the same time, is retained at the position shown in the drawing always by the rotation zone limitation pin 621. A reset lever 622 is fixed at the above mentioned support axle 619. 623a is a reset driving pin and is fixedly provided on the reset driving disk 623 being axially supported at the support axle 624 in a rotatable manner, and at the same time is so provided as engageable with the above mentioned reset lever 622. A stopper reset lever 625 is fixed at the other end of the above mentioned support axle 619.

626 is an attracting piece manufactured by soft magnetic material, and is so arranged as can be shifted to an attracted position and a separated position to and from $Mg_{12}$ by a support axle 627, and its end part 626 is so provided as being engageable with the above mentioned ratchet wheel 610 and the above mentioned stopper reset lever 625, also is given a shifting tendency in a separating direction by the spring 628. 629, 630, 631 are fixed pins for each spring. The support axles of the above mentioned gears, levers, etc. are axially supported rotatably by a conventionally known means in a case body which is omitted from the drawing.

FIG. 6b is directed to a control circuit diagram of the mechanism shown in FIG. 6a, and in said drawing, 632 is a photographing lens, 601 is the above mentioned lens barrel, 633 is a half mirror, 634 is a shutter screen, 635 is a film, 636 is a focusing detection photo-electric converter, 637 is a pre-amplifier, 638 is a differentiator, 639 is a rectifier, 640 is a pulse shaping equipment, 641 is an inversion power amplifier, 642 is a focusing start switch, 643 is an accumulator, 645 is a power source, and 646 is a resistance.

The function of the above mentioned set-up is explained referring to FIG. 6a and FIG. 6b. FIG. 6a shows a photographing ready state, that is a state that a photographing lens is at the infinite sighting position. While the lens is supposed to be at the infinite sighting position for convenience, it is naturally possible to set it at the nearest distance position, and the over focus distance position, etc. As a photographer closes the focusing start switch 642, the electric charge accumulated at the accumulator 643 is discharged through $Mg_{11}$, thus Mg$_{11}$ loses attracting power, and the lens barrel 601 is rotated to clockwise direction by the spring 616.

Figures 6C, 6D, 6E:
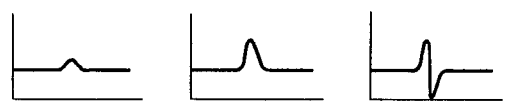
FIG. 6c to FIG. 6h are functional waveform diagrams of the block shown in FIG. 6b.
Figures 6F, 6G, 6H:
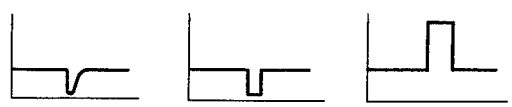

In FIG. 6b, by the rotation of the above mentioned lens barrel the photographing lens 632 is pulled out and when focussing is made onto an object intended, the output of the photo-electric conversion element 636 shows the maximum value as shown in FIG. 6c.

This output is impressed to Mg$_2$ through 637, 638, 639, 640, and 641 as such pulse shape voltage as shown in FIG. 12h, and Mg$_{12}$ loses attracting power, then the attracting piece 626 is shifted to a separating position by the spring 628, therefore the end part 626a of the attracting piece 626 comes to face the rotation zone of the ratchet wheel 610 which has been rotated through gear train and mono-directional clutch by the rotation of the lens barrel 601, to stop said clutch. Therefore, the lens barrel 601 has its rotation stopped and the pull-out action of the lens is stopped, thus focusing action is completed. At the time of rotation of the lens barrel 601, a control device consisting of 612, 613, 614 retains the rotation speed of the rotation system at appropriate level in relation with the light receiving element and the signal processing circuit, also serves to dump the shock at the time of stop.

Thereafter, the function of the camera proceeds following the process described in the explanation of the function for FIG. 4, thus completing photographing. Then as the photographer operates the shutter and the film wind up device of the camera, a reset driving disk 623 which is so made as linked with said operation by a conventionally known method makes one rotation to the direction of arrow and the pin 623a rotates the reset lever 622, then the lever 625 which is fixed in place coaxially therewith and the pin 617 on the 618 rotate the 626 and 601, respectively, and the 626 and 615 are attracted to the Mg$_2$, Mg$_1$, respectively at the end of said rotation, resuming the original state of this explanation, thus completing a cycle of operation.

As has been explained above, it is possible in the present invention that each control operation can be done with comparatively weak driving current yet with good responsive characteristics by using an electro-magnetic mechanism forming a confluent magnetic path retaining a permanent magnet, as an electro-magnetic mechanism. Thus it is quite suited and useful for a camera. Also, when the power source voltage becomes lower than a prescribed value, an erroneous function prevention circuit functions, thus the control devices of a camera properly function to obtain appropriate exposure.

What is claimed is:

1. An electro-magnetic control system for a camera, comprising:
    diaphragm control means;
    mirror driving means;
    driving power means for driving said diaphragm control means and said mirror driving means, the driving power means having a driving spring means to be charged for producing power for driving said control means and said mirror driving means;
    initiation means arranged to hold said diaphragm control means and said mirror driving means in a charged state thereof and then to be movable for releasing said diaphragm control means and mirror driving means from the charged state to an actuating state;
    electro-magnetic release means for operating said initiation means, said electro-magnetic release means being provided with an electro-magnet equipped with a permanent magnet, the magnetic flux of which causes said electro-magnet to attract an armature interlocked with said initiation means, said electro-magnetic release means being arranged such that, when the excitation coil thereof is energized, said magnetic flux of said permanent magnet is offset by a magnetic flux produced by the excitation coil to release said armature from the attraction by said electro-magnet, said armature having biasing means for applying a given force thereto sufficient to release said initiation means into an actuating state;
    a power source;
    current supplying means connected to said power source to supply an electric current to said excitation coil, said current supplying means having a capacitor which is charged with a current supplied from said power source and a resistor which restricts the capacitor charging current, said capacitor being provided with a discharge route to which said excitation coil is connected, said current supplying means being provided with electronic switching means for adding a driving pulse to the excitation coil from the capacitor;
    current supply control means which controls the energization of said excitation coil effected by a discharging operation of said capacitor, said current supply control means being provided with control circuit means connected with said electronic switching means for turning on the latter during a predetermined period;
    switch means having a first switch and a second switch, said second switch controlling the operation of said current supply control means, and being arranged to be turned on to actuate said current supply control means for energizing said excitation coil by allowing said capacitor to perform said discharging operation, said switch means having delay means for generating an operation signal to control the operation of said current supply control means a predetermined time after said switch means becomes on; and
    releasing operation means for turning on the first switch by a stroke and turning on the second switch by a second stroke.

2. A system according to claim 1, further including erroneous action preventing means which detects whether or not the voltage of said power source is at least a predetermined value, said erroneous action preventing means being arranged to render said current supply control means inoperative when the voltage of said power source drops to a value below said predetermined value, said preventing means comprising adjusting means for adjusting said predetermined value.

3. A system according to claim 2, further including display means which provides a display when said erroneous action preventing means detects that the voltage of said power source has dropped to a value below said predetermined value.

4. A single lens reflex camera comprising:
    (a) camera triggering means having a release button and driving circuit for producing a release impulse signal in response to the operation of the release button;

(b) electro-magnetic release means for effecting an initiation of the camera photographing function in response to the impulse signal;
(c) diaphragm control means for adjusting a diaphragm aperture value;
(d) photometric means for measuring an object to be photographed;
(e) photographic information setting means other than the diaphragm aperture value;
(f) means for computing the output of the photometric means and the output of the setting means and adapting to produce an impulse control signal based on the computed result;
(g) the diaphragm control means having:
  (1) initiation means arranged to actuate said diaphragm control means;
  (2) displace means to be allowed movable after the activation of the electro-magnetic release means corresponding to the adjusting diaphragm aperture value;
  (3) speed converting means associated with the displace means; and
  (4) electro-magnetic control means responsive to the impulse control signal for terminating the displacement of the displace means through an engagement thereof with a reduced portion of the speed converting means;
(h) each of the electro-magnetic release means and the electro-magnetic control means having:
  (1) magnetic attracting including an attracting end;
  (2) movable means shiftable between a first position to contact the end of the magnetic attracting means and a second position to be separated from the end of the attracting means, wherein the movable means drives the initiation means as it is shifted from the first position to the second position;
  (3) a permanent magnet provided in a magnetic flux path formed through the magnetic attracting means and the movable means for retaining the movable means at the first position by its magnetic attraction;
  (4) biasing means for biasing the movable means, wherein the biasing means has sufficient biasing power to shift the movable means to the second position against the attracting power of the magnetic attracting means based on the permanent magnet; and
  (5) coil means which generates, at the magnetic attracting means, a magnetic flux with a direction reverse to the direction of magnetic flux which comes from the permanent magnet;
(i) means for preparing a starting state by shifting each movable means to the first position, the preparing means being operatively connected temporarily with each movable means until the latter is attracted to the end of the magnetic attracting means and disconnected thereafter so as to enable each movable means to be displaced to the second position by the biasing power of the biasing means based on the reverse directional magnetic flux of the coil means, and
wherein the camera triggering means has:
  (1) first switching means; and
  (2) second switching means;
    the first switching means and the second switching means being associated with the release button, during the first stroke of which the first switching means being switched over and during the second switch of which subsequent to the first stroke the second switching means being switched over, wherein the camera comprises a sequential power supply circuit connected with the first switching means and the second switching means for activating the photographic information setting means based on the switch-over of the first switching means, and subsequently activating the driving circuit based on the switch-over of the second switching means and wherein the camera further comprises delay means connected to the driving circuit for delaying the activation of the latter, the delay means being activated by the second switching means.

5. The single lens reflex camera according to claim 4, wherein the magnetic attracting means has a pair of magnetic pieces, the magnetic pieces having a magnetic flux shunting path portion for forming a closed magnetic circuit between the movable means and the magnetic pieces through the shunting path portion, and the permanent magnet being interposed between the magnetic pieces.

6. A single lens reflex camera comprising:
(a) camera triggering means having a release button and driving circuit for producing a release impulse signal in response to the operation of the release button;
(b) electro-magnetic release means for effecting an initiation of the camera photographing function in response to the impulse signal;
(c) diaphragm control means for adjusting a diaphragm aperture value;
(d) photometric means for measuring an object to be photographed;
(e) photographic information setting means other than the diaphragm apertured value;
(f) means for computing the output of the photometric means and the output of the setting means and adapting to produce an impulse control signal based on the computed result;
(g) the diaphragm control means having:
  (1) initiation means arranged to actuate said diaphragm control means;
  (2) displace means to be allowed movable after the activation of the electro-magnetic release means corresponding to the adjusting diaphragm aperture value;
  (3) speed converting means associated with the displace means; and
  (4) electro-magnetic control means responsive to the impulse control signal for terminating the displacement of the displace means through an engagement thereof with a reduced portion of the reduction means;
(h) each of the electro-magnetic release means and the electro-magnetic control means having:
  (1) magnetic attracting including an attracting end;
  (2) movable means shiftable between a first position to contact the end of the magnetic attracting means and a second position to be separated from the end of the attracting means, wherein the movable means drives the initiation means as it is shifted from the first position to the second position;
  (3) a permanent magnet provided in a magnetic flux path formed through the magnetic attracting means and the movable means for retaining the movable means at the first position by its magnetic attraction;

(4) biasing means for biasing the movable means, wherein the biasing means has sufficient biasing power to shift the movable means to the second position against the attracting power of the magnetic attracting means based on the permanent magnet; and (5) coil means which generates, at the magnetic attracting means, a magnetic flux with a direction reverse to the direction of magnetic flux which comes from the permanent magnet;

(i) means for preparing a starting state by shifting each movable means to the first position, the preparing means being operatively connected temporarily with each movable means until the latter is attracted to the end of the magnetic attracting means and disconnected thereafter so as to enable each movable means to be displaced to the second position by the biasing power of the biasing means based on the reverse directional magnetic flux of the coil means, and wherein the camera triggering means has:
(1) first switching means; and
(2) second switching means;

the first switching means and the second switching means being associated with the release button, during the first stroke of which the first switching means being switched over and during the second switch of which subsequent to the first stroke, the second switching means being switched over, wherein the camera comprises a sequential power supply circuit connected with the first switching means and the second switching means for activating the photographic information setting means based on the switch-over of the first switching means, and subsequently activating the driving circuit based on the switch-over of the second switching means and wherein the camera further comprises delay means connected to the driving circuit for delaying the activation of the latter, the delay means being activated by the second switching means.

* * * * *